(12) United States Patent
Legeay

(10) Patent No.: US 8,596,206 B2
(45) Date of Patent: Dec. 3, 2013

(54) TRAY TABLE ASSEMBLY

(75) Inventor: Alexis Legeay, Les Bordes (FR)

(73) Assignee: Zodiac Seats France (FR)

( * ) Notice: Subject to any disclaimer, the term of this patent is extended or adjusted under 35 U.S.C. 154(b) by 0 days.

(21) Appl. No.: 13/342,353

(22) Filed: Jan. 3, 2012

(65) Prior Publication Data

US 2012/0167807 A1 Jul. 5, 2012

Related U.S. Application Data

(60) Provisional application No. 61/429,243, filed on Jan. 3, 2011.

(51) Int. Cl.
*B65D 19/00* (2006.01)

(52) U.S. Cl.
USPC ........... 108/50.11; 108/44; 108/137; 297/145

(58) Field of Classification Search
USPC ............... 108/41, 11, 33, 42, 44, 50.11, 137; 297/173, 135, 145; 312/280–282, 307; 248/274.1, 276.1, 283.1, 284.1, 278.1, 248/281.11; 296/37.16, 24.34, 37.15; 244/118.5, 118.3, 122 R
See application file for complete search history.

(56) References Cited

U.S. PATENT DOCUMENTS

| | | | |
|---|---|---|---|
| 3,467,432 A * | 9/1969 | Sullivan | 297/162 |
| 3,583,760 A * | 6/1971 | McGregor | 297/145 |
| 5,547,247 A * | 8/1996 | Dixon | 297/145 |
| 6,793,281 B2 * | 9/2004 | Duerr et al. | 297/147 |
| 7,874,614 B2 * | 1/2011 | Figueras Mitjans | 297/145 |
| 7,963,231 B2 * | 6/2011 | Osborne et al. | 108/40 |
| 2003/0159628 A1 * | 8/2003 | Salzer et al. | 108/115 |
| 2005/0012375 A1 * | 1/2005 | Giasson | 297/411.31 |
| 2010/0319588 A1 * | 12/2010 | Hanna et al. | 108/20 |
| 2011/0067606 A1 * | 3/2011 | Sundarrao | 108/44 |

FOREIGN PATENT DOCUMENTS

| | | |
|---|---|---|
| EP | 2353931 A2 | 8/2011 |
| WO | 0192055 A1 | 12/2001 |
| WO | 2008141829 A1 | 11/2008 |

OTHER PUBLICATIONS

International Search Report and Written Opinion dated Jul. 3, 2012 in Application No. PCT/IB2012/000167.
International Preliminary Report on Patentability dated Jul. 18, 2013 in Application No. PCT/IB2012/000167.

* cited by examiner

*Primary Examiner* — Daniel Rohrhoff
(74) *Attorney, Agent, or Firm* — Dean W. Russell; Tiffany L. Williams; Kilpatrick Townsend & Stockton LLP

(57) ABSTRACT

Described are tray table assemblies having a table body, a support arm comprising a first end rotatably coupled to the table body, a linkage comprising a first end rotatably coupled to the table body, and a receptacle, wherein a second end of the support arm and a second end of the linkage are rotatably coupled to the receptacle. The table body may be configured to rotate within a substantially horizontal plane relative to the support arm, and the support arm and the linkage may be configured to rotate within a substantially horizontal plane relative to the receptacle.

18 Claims, 5 Drawing Sheets

TRAY TABLE ASSEMBLY

CROSS REFERENCE TO RELATED APPLICATION

This application is related to and claims priority benefits from U.S. Provisional Application Ser. No. 61/429,243, filed on Jan. 3, 2011, entitled MEAL TRAY KINEMATIC. The '243 application is hereby incorporated herein in its entirety by this reference.

FIELD OF THE INVENTION

The invention relates to tray tables for passenger seats or the like.

BACKGROUND

Many passenger seats such as those on passenger aircraft, buses, trains, and the like are equipped with foldable tray tables. The tray tables may be used for eating, working, or for supporting small items during transport. The tray tables are configured to be used during transport and stowed during takeoff, landing, and other dangerous flight conditions.

In many cases, the tray tables are stowed within armrests of passenger seats. Deployment from such stowed positions often requires lifting the tray table out of the armrest, then rotating the tray table into a horizontal position in front of the passenger. These types of deployments typically require a significant amount of space and may interfere with other passengers' comfort or other parts of the passenger cabin. Such deployments may also be difficult for passengers to understand or maneuver into position.

In certain situations, it may be desirable to reduce the amount of space required to deploy the tray table, while also minimizing the risk of misuse or interference with other passengers or the surrounding seats or cabin.

SUMMARY

Embodiments of the present invention include a tray table assembly comprising a table body, a support arm comprising a first end rotatably coupled to the table body, a linkage comprising a first end rotatably coupled to the table body, and a receptacle, wherein a second end of the support arm and a second end of the linkage are rotatably coupled to the receptacle, wherein the table body is configured to rotate within a substantially horizontal plane relative to the support arm, and the support arm and the linkage are configured to rotate within a substantially horizontal plane relative to the receptacle. In some embodiments, the support arm and the linkage are configured to be positioned adjacent at least a portion of an underside of the table body when the table body is in a deployed position.

In certain embodiments, the tray table comprises at least two segments, wherein the first segment is pivotally coupled to the second segment. In these embodiments, the support arm and the linkage may be configured to be positioned adjacent at least a portion of the first segment when the table body is in a deployed position. In these embodiments, the first segment may be rotated away from the second segment so that a work surface of the table body is exposed. A handle may be configured to extend from an edge of the first segment.

In these embodiments, the support arm may be shaped to overlap at least a portion of the linkage and/or at least a portion of the table body. The support arm may also comprise a groove that is configured to receive a coupling between the first end of the linkage and the table body. In some embodiments, the receptacle is shaped to house the table body, the support arm, and the linkage in the stowed position.

The tray table assembly may be deployed by rotating the table body from a stowed position within the receptacle to a deployed position, wherein the second segment of the table body rotates within a substantially horizontal plane, and pivotally rotating the first segment away from the second segment so that a work surface of the table body is exposed.

DETAILED DESCRIPTION

The described embodiments of the invention provide tray table assemblies for use with passenger seats. While the tray table assemblies are discussed for use with aircraft seats, they are by no means so limited. Rather, embodiments of the tray table assemblies may be used in passenger seats or other seats of any type or otherwise as desired.

FIGS. 1-7 illustrate embodiments of a tray table assembly 10. In these embodiments, the tray table assembly 10 comprises a table body 12, a support arm 14, and a linkage 16.

The table body 12 may be formed of materials including but not limited to aluminum, stainless steel, aramid fibers, polycarbonate, polypropylene, other plastic materials, other metallic materials, composite materials, or other similar materials. One of skill in the art will understand that any suitable materials may be used to form the table body 12 that will provide a lightweight table body 12 having sufficient strength to withstand forces that may be placed on the tray table assembly 10.

In some embodiments, as illustrated in FIGS. 1-7, the table body 12 may have a rectilinear shape. However, one of ordinary skill in the relevant art will understand that the table body 12 may have any suitable shape including but not limited to rectilinear, trapezoidal, parabolic, or other suitable shape.

The table body 12 may be integrally formed as a single piece or may include multiple segments, which are coupled to one another to form the table body 12. In some embodiments, as shown in FIGS. 1-7, the segments 12A, 12B may be pivotally coupled to one another so that the segment 12A may be folded over the segment 12B in preparation for positioning the table body 12 in a stowed position. The compact folding design of the table body 12 reduces the amount of depth required to stow the table body 12 (as best illustrated in FIGS. 3 and 4). While the embodiments illustrated in FIGS. 1-7 include two segments 12A, 12B, one of ordinary skill in the relevant art will understand that the table body 12 may include any suitable number of segments, where additional segments may be used to further minimize the amount of depth required to stow the table body 12.

Figure 6:
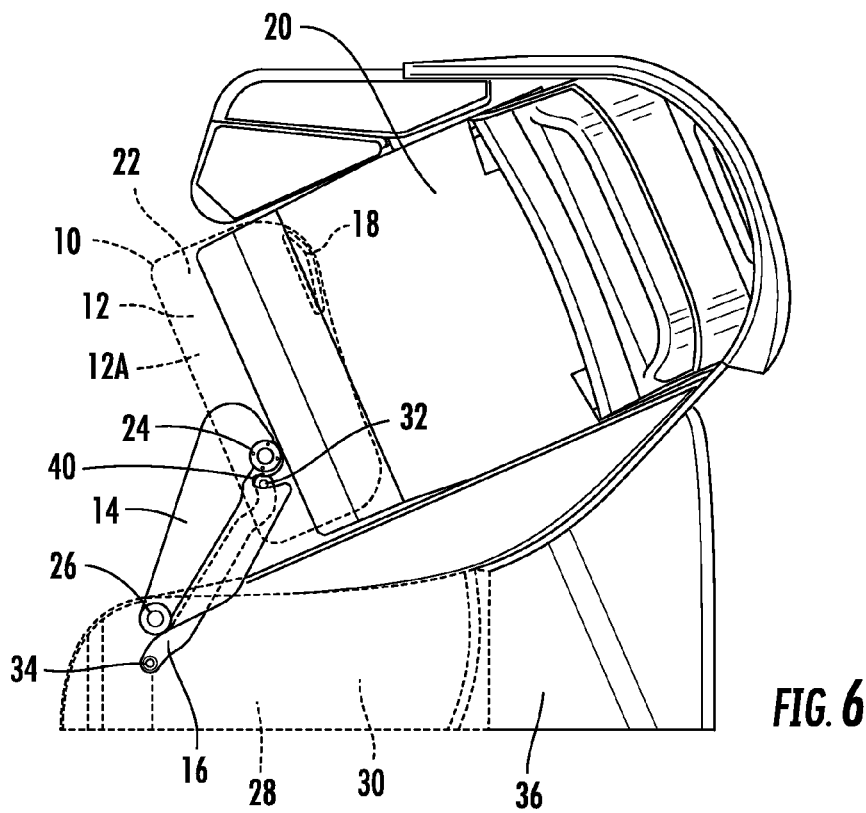
FIG. 6 is a top view of the tray table assembly of FIG. 1 in a deployed position adjacent a passenger seat with a first segment of a table body folded over a second segment of a table body.
Figure 7:
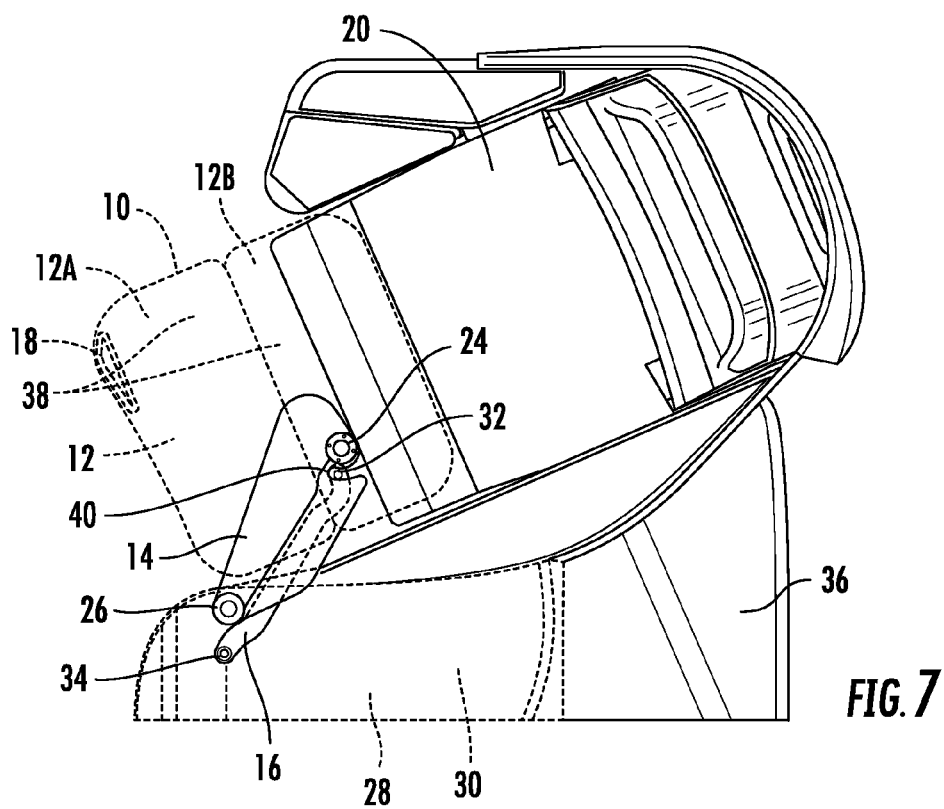
FIG. 7 is a top view of the tray table assembly of FIG. 1 in a deployed position adjacent a passenger seat.

The segment 12A may also include a handle 18, which may comprise a projection that extends from an edge of the segment 12A. When the segment 12A is unfolded from the segment 12B into a deployed position (as best illustrated in FIGS. 2 and 7), the handle 18 is positioned on a forward side of the table body 12 away from a passenger seated in a passenger seat 20. When the segment 12A is folded over the segment 12B (as best illustrated in FIG. 6), the handle 18 is positioned on an aft side of the table body 12 adjacent a passenger seated in the passenger seat 20. In certain embodiments, the handle 18 is located in a position that minimizes the force required to move the table body 12 between the stowed and deployed positions, as well as offers a natural position for use by the passenger. However, one of ordinary skill in the relevant art will understand that any suitable location may be used for the handle 18.

Figure 1:
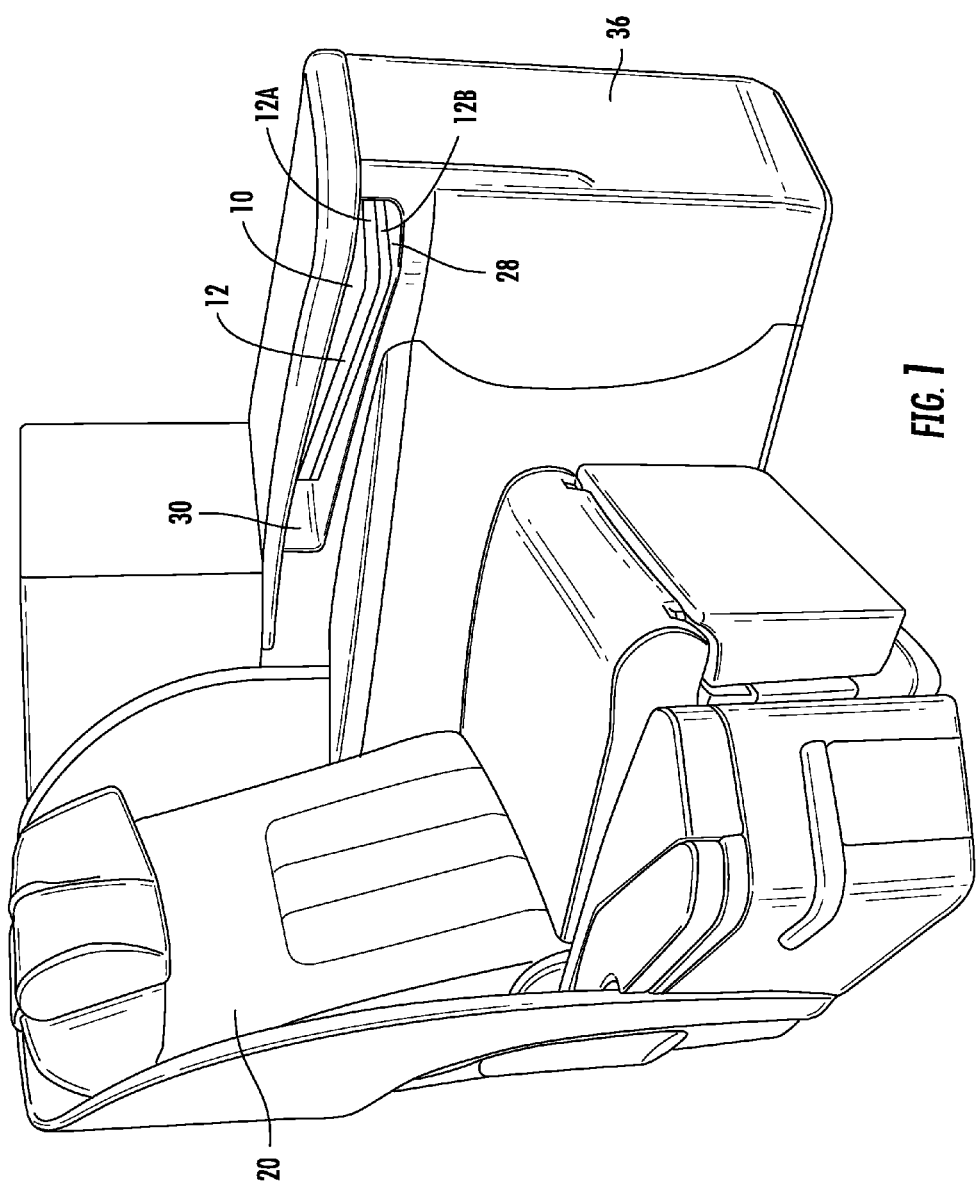
FIG. 1 is a perspective view of a tray table assembly in a stowed position adjacent a passenger seat according to certain embodiments of the present invention.
Figure 2:
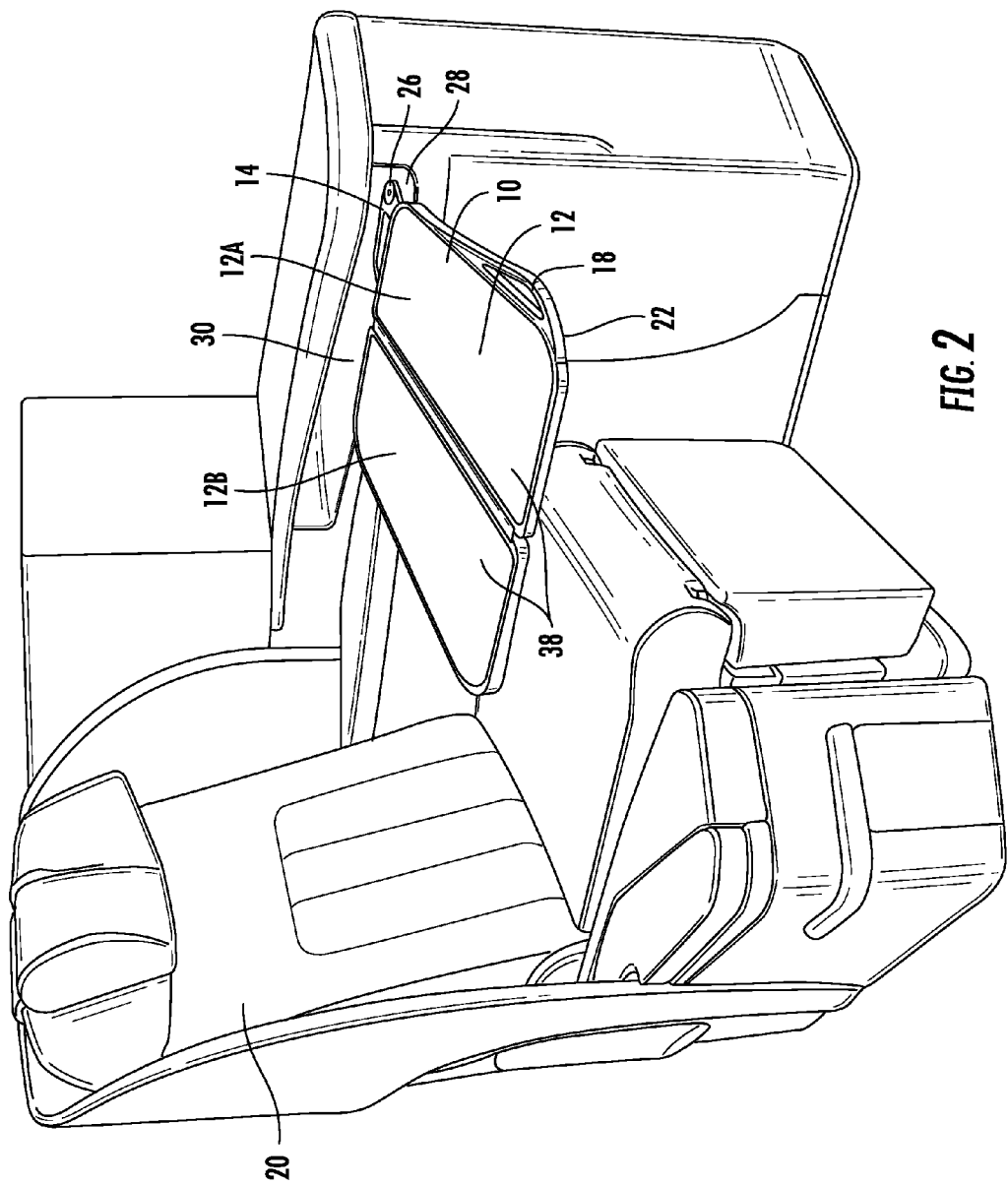
FIG. 2 is a perspective view of the tray table assembly of FIG. 1 in a deployed position adjacent a passenger seat.
Figure 3:
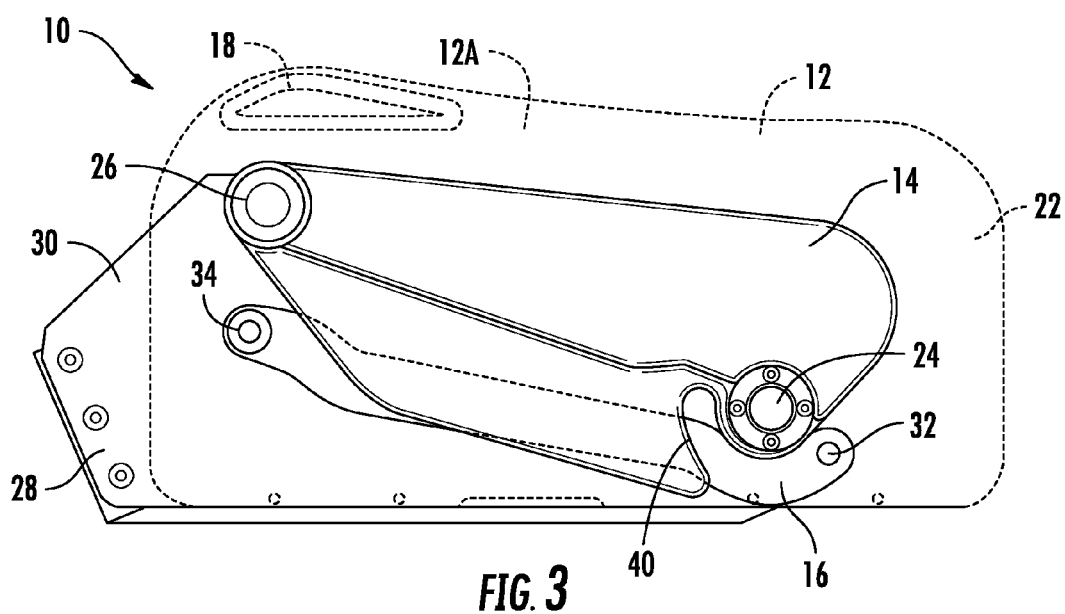
FIG. 3 is a top view of the tray table assembly of FIG. 1 in a stowed position.
Figure 4:
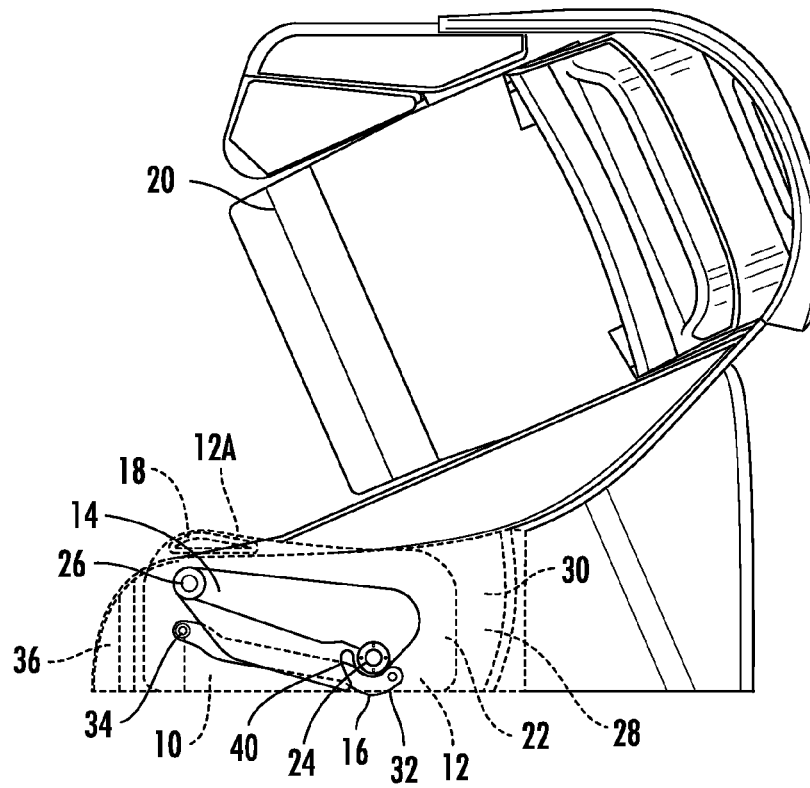
FIG. 4 is a top view of the tray table assembly of FIG. 1 in a stowed position adjacent a passenger seat.

In some embodiments, as shown in FIGS. 2-7, the support arm 14 may be positioned adjacent at least a portion of an underside 22 of the table body 12 to function as a deployment mechanism to rotate the table body 12 between the stowed position (as shown in FIGS. 1, 3, and 4) and the deployed position (as shown in FIGS. 2 and 7), as well as to provide structural support to the table body 12 in the deployed position. The support arm 14 may be formed of constructed of any suitable material including but not limited to aluminum, stainless steel, other metallic materials, composite materials, or other similar materials that provides sufficient strength to withstand forces that may be placed on the tray table assembly 10.

In embodiments where the table body 12 comprises multiple segments, such as the segments 12A, 12B, the support arm 14 may be configured to be positioned adjacent at least a portion of the underside 22 of either or both segments 12A, 12B in the deployed position, as best illustrated in FIG. 7. In these embodiments, the support arm 14 may also serve as a stop to support the segment 12A when the segment 12A is unfolded from segment 12B. In other embodiments, a separate stop may be included with the table body 12 so that the segment 12A does not require support from the support arm 14 in the deployed position.

In certain embodiments, as best illustrated in FIG. 7, the segment 12B may be rotatably coupled to the support arm 14. However, one of skill in the relevant art will understand that any suitable region or segment of the table body 12 may be coupled to the support arm 14. In these embodiments, a first end 24 of the support arm 14 may be rotatably coupled to the underside 22 of the segment 12B, and a second end 26 of the support arm 14 may be rotatably coupled to a lower surface 28 of a receptacle 30 that is configured to house the table body 12 in the stowed position. In other embodiments, the second end 26 of the support arm 14 may be coupled to a surface adjacent the receptacle 30 or to other locations within the receptacle 30. Suitable mechanical fasteners for rotatably coupling these components include but are not limited to screws, rivets, bolts, hinges, beam coupling, rotating component fasteners, pins, or any other suitable fastening device.

In some embodiments, as shown in FIGS. 3-7, the linkage 16 may also be positioned adjacent at least a portion of the underside 22 of the table body 12. Similar to the support arm 14, the linkage 16 functions as a deployment mechanism to rotate the table body 12 between the stowed position (as shown in FIGS. 1, 3, and 4) and the deployed position (as shown in FIGS. 2 and 7), as well as to provide additional structural support to the table body 12 in the deployed position. The linkage 16 also serves as a guide mechanism to maintain the horizontal orientation of the table body 12 relative to the support arm 14 between the stowed and deployed positions. The linkage 16 may be formed of constructed of any suitable material including but not limited to aluminum, stainless steel, other metallic materials, composite materials, or other similar materials that provide sufficient strength to withstand forces that may be placed on the tray table assembly 10.

In embodiments where the table body 12 comprises multiple segments, such as the segments 12A, 12B, the linkage 16 may also be configured to be positioned adjacent at least a portion of the underside 22 of either or both segments 12A, 12B in the deployed position, as best illustrated in FIG. 7. In these embodiments, the linkage 16 may also serve as a stop to support the segment 12A when the segment 12A is unfolded from segment 12B. In other embodiments, a separate stop may be included with the table body 12 or the support arm 14 may provide sufficient support so that the segment 12A does not require support from the linkage 16 in the deployed position. In some embodiments, the linkage 16 may be shaped to be positioned adjacent the segment 12B only. However, one of ordinary skill in the relevant art will understand that any suitable arrangement of the support arm 14 and the linkage 16 may be used as needed to provide a stable table body 12 in the deployed position and to provide a mechanism to maneuver the table body 12 between the deployed position and the stowed position.

In some embodiments, as best illustrated in FIG. 7, the segment 12B may be rotatably coupled to the linkage 16. However, one of skill in the relevant art will understand that any suitable region or segment of the table body 12 may be coupled to the linkage 16. In these embodiments, a first end 32 of the linkage 16 may be rotatably coupled to the underside 22 of the segment 12B, and a second end 34 of the linkage 16 may be rotatably coupled to the lower surface 28 of the receptacle 30. In other embodiments, the second end 34 of the linkage 16 may be coupled to a surface adjacent the receptacle 30 or to other locations within the receptacle 30. Suitable mechanical fasteners for rotatably coupling these components include but are not limited to screws, rivets, bolts, hinges, beam coupling, rotating component fasteners, pins, or any other suitable fastening device.

In certain embodiments, the receptacle 30 may be positioned within a structure 36, which may be positioned adjacent the passenger seat 20 or may be located in an adjacent wall or other structure having a surface that is accessible from the side of the passenger seat 20. The receptacle 30 is configured to have a volume that accommodates substantially all of the surface area and the height of the table body 12 in the stowed position. For example, in some embodiments, the receptacle 30 may be configured to house the table body 12 in an unfolded configuration, such as in the examples where the table body 12 is formed as an integral piece. In embodiments where the table body 12 comprises multiple segments that are folded over one another for stowage, the receptacle 30 may include a larger height to accommodate a greater thickness of the folded table body 12 and a shallower depth to accommodate a slimmer surface area of the folded table body 12. One of ordinary skill in the relevant art will understand that any suitable configuration of height and depth of the receptacle 30 may be used that will fit within the structure 36, adjacent wall, or other adjacently positioned surface, while also accommodating the stowed shape of the table body 12, as well as the support arm 14 and/or the linkage 16, wherein the table body 12 may include a single integral piece or multiple segments folded over, collapsed, or otherwise compacted within one another.

Figure 5:
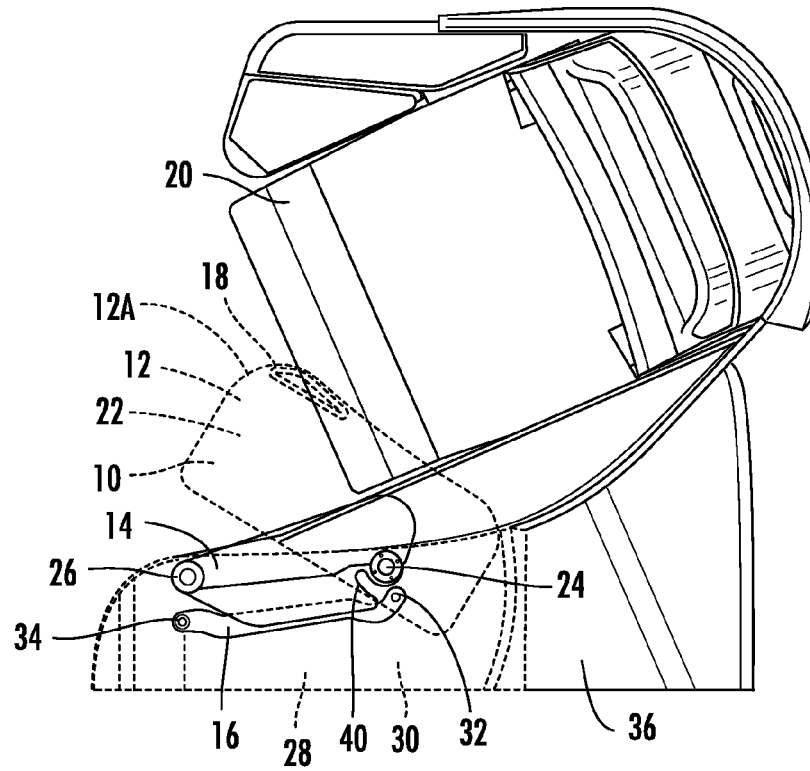
FIG. 5 is a top view of the tray table assembly of FIG. 1 in a partially deployed position adjacent a passenger seat.

To rotate the table body 12 into the stowed position (FIG. 4) from the deployed position (FIG. 7), the segment 12A is folded over the segment 12B so that the handle 18 is positioned on the aft side of the table body 12 (FIG. 6). A force is then exerted against the handle 18 or the table body 12 itself to move the table body 12 away from the passenger seat 20. The application of a pushing force causes the table body 12 to rotate into alignment with the support arm 14 and/or the linkage 16, and also causes the support arm 14 and/or the linkage 16 to rotate into alignment with the receptacle 30 (FIG. 5). The rotation of the table body 12, the support arm 14, and/or the linkage 16 around each coupling point causes the table body 12, the support arm 14, and/or the linkage 16 to retract into the stowed position within the receptacle 30 (FIG. 4).

To rotate the table body 12 from the stowed position (FIG. 4) into the deployed position (FIG. 7), a force is applied to the handle 18 or the table body 12 itself to move the table body 12 away from the receptacle 30. The application of a pulling force causes the table body 12 to rotate away from the support arm 14 and/or the linkage 16 so as to form an angle between the table body 12 and the support arm 14 and/or the linkage 16, as well as causing the support arm 14 and/or the linkage 16 to rotate away from the receptacle 30 so as to form an angle between the receptacle 30 and the support arm 14 and/or the linkage 16 (FIG. 5). The rotation of the table body 12, the support arm 14, and/or the linkage 16 around each coupling point causes the table body 12, the support arm 14, and/or the linkage 16 to extend into the deployed position adjacent the passenger seat 20 (FIG. 6). The handle 18 and/or the segment 12A itself is then lifted and rotated away from the segment 12B so that a work surface 38 of the table body 12 is exposed for use by the passenger seated in the passenger seat 20 (FIG. 7).

Throughout the rotation between the stowed and the deployed positions, at least the segment 12B of the table body 12, the support arm 14, and the linkage 16 rotate within a substantially horizontal plane. By utilizing an adjacently positioned receptacle 30, minimal space is required to deploy the table body 12 from the stowed position into the deployed position and vice versa, and the substantially horizontal movement does not interfere with the surrounding seats or any other part of the passenger cabin.

As discussed above, the support arm 14 may be shaped to offer support for the pivoting portion of the table body (i.e., segment 12A as discussed above). The support arm 14 may also be shaped to minimize or prevent potential pinch points between the support arm 14, the linkage 16, and the table body 12 for any position of the table body 12 throughout its rotation between the stowed and deployed positions. For example, pinch points often form when two objects rotate away from one another leaving a gap between the two objects, which is then closed when the two objects rotate toward one another. An item that is inserted into the gap may be pinched when the two objects rotate toward one another to close the gap. These types of pinch points may be minimized or eliminated by shaping at least one of the two objects to enclose any such accessible gaps that may form along the rotational path. For example, as illustrated in FIGS. 4-7, the support arm 14 is shaped so that the support arm 14 overlaps at least a portion of the table body 12 during rotation between the stowed and deployed positions so that the passenger does not inadvertently pinch his or her fingers or other body parts between the support arm 14 and the table body 12.

Likewise, the support arm 14 is shaped to overlap at least a portion of the linkage 16 during rotation between the stowed and deployed positions so that the passenger does not inadvertently pinch his or her fingers or other body parts between the support arm 14 and the linkage 16. In these cases, a groove 40 may be positioned adjacent the first end 24 of the support arm 14 that is configured to receive the coupling between the first end 32 of the linkage 16 and the table body 12. The groove 40 allows the table body 12 to rotate relative to both the support arm 14 and the linkage 16 without the support arm 14 and/or the linkage 16 restricting the rotation of the table body 12 or vice versa. In other embodiments, the groove 40 may be positioned adjacent the first end 32 or the second end 34 of the linkage 16, the second end 26 of the support arm 14, or any other suitable location that allows the components to rotate as needed between the stowed and deployed positions.

The length of the groove 40 may also be configured to position the table body 12 into the deployed position by shaping the groove 40 so that the coupling between the first end 32 and the segment 12B contacts the end of the groove 40 when the table body 12 reaches the deployed position.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A combination of a tray table assembly and a passenger seat, the tray table assembly comprising:
   (a) a table body;
   (b) a support arm comprising a first end rotatably coupled to the table body;
   (c) a linkage comprising a first end rotatably coupled to the table body; and
   (d) a receptacle, wherein a second end of the support arm and a second end of the linkage are rotatably coupled to the receptacle;
   wherein the table body is positioned within the receptacle in a stowed position and is configured to move away from the receptacle and rotate within a substantially horizontal plane to a deployed position forward of a passenger seat through application of a pulling force,
   wherein the support arm is shaped to overlap at least a portion of the linkage throughout an entire path traveled by the table body between the stowed position and the deployed position in order to minimize finger pinch hazards.

2. The tray table assembly of claim 1, wherein the support arm and the linkage are configured to be positioned adjacent at least a portion of an underside of the table body when the table body is in the deployed position.

3. The tray table assembly of claim 1, wherein the table body comprises at least two segments.

4. The tray table assembly of claim 3, wherein a first segment of the at least two segments is pivotally coupled to a second segment of the at least two segments.

5. The tray table assembly of claim 4, wherein the support arm and the linkage are configured to be positioned adjacent at least a portion of the first segment when the table body is in the deployed position.

6. The tray table assembly of claim 4, further comprising a handle configured to extend from an edge of the first segment in a location that minimizes a force required to move the table body between the stowed and deployed positions.

7. The tray table assembly of claim 1, wherein the support arm is shaped to overlap at least a portion of the table body throughout an entire path traveled by the table body between the stowed position and the deployed position in order to minimize finger pinch hazards.

8. The tray table assembly of claim 1, wherein the support arm comprises a groove that is configured to receive a coupling between the first end of the linkage and the table body.

9. The tray table assembly of claim 1, wherein the receptacle is shaped to house the table body, the support arm, and the linkage.

10. A combination of a tray table assembly and a passenger seat, the tray table assembly comprising:
 (a) a table body comprising a first segment and a second segment;
 (b) a support arm comprising a first end rotatably coupled to the second segment of the table body;
 (c) a linkage comprising a first end rotatably coupled to the second segment of the table body; and
 (d) a receptacle, wherein a second end of the support arm and a second end of the linkage are rotatably coupled to the receptacle;
 wherein the second segment of the table body is positioned within the receptacle in a stowed position and is configured to move away from the receptacle and rotate within a substantially horizontal plane to a deployed position forward of a passenger seat through application of a pulling force,
 wherein the support arm is shaped to overlap at least a portion of the linkage throughout an entire path traveled by the table body between the stowed position and the deployed position in order to minimize finger pinch hazards.

11. The tray table assembly of claim 10, wherein the support arm and the linkage are configured to be positioned adjacent at least a portion of an underside of the second segment when the table body is in the deployed position.

12. The tray table assembly of claim 10, wherein the first segment is pivotally coupled to the second segment.

13. The tray table assembly of claim 12, wherein the support arm and the linkage are configured to be positioned adjacent at least a portion of the first segment when the table body is in the deployed position and the first segment is rotated away from the second segment so that a work surface of the table body is exposed.

14. The tray table assembly of claim 10, further comprising a handle configured to extend from an edge of the first segment in a location that minimizes a force required to move the table body between the stowed and deployed positions.

15. A method of deploying a tray table assembly, the tray table assembly comprising a table body comprising a first segment and a second segment, a support arm comprising a first end rotatably coupled to the second segment of the table body, a linkage comprising a first end rotatably coupled to the second segment of the table body, and a receptacle rotatably coupled to a second end of the support arm and a second end of the linkage, the method comprising:
 (a) moving the table body away from a stowed position within the receptacle and rotating the table body within a substantially horizontal plane to a deployed position forward of a passenger seat; and
 (b) pivotally rotating the first segment away from the second segment so that a work surface of the table body is exposed,
 wherein the support arm is shaped to overlap at least a portion of the linkage throughout an entire path traveled by the table body between the stowed position and the deployed position in order to minimize finger pinch hazards.

16. The method of claim 15, wherein the support arm and the linkage are configured to be positioned adjacent at least a portion of the first segment when the work surface of the table body is exposed.

17. The method of claim 15, further comprising a handle configured to extend from an edge of the first segment in a location that passenger to minimizes a force required to move the table body between the stowed and deployed positions.

18. The method of claim 15, wherein the receptacle is shaped to house the table body, the support arm, and the linkage in the stowed position.

* * * * *